United States Patent [19]

Millot

[11] Patent Number: 4,657,725
[45] Date of Patent: Apr. 14, 1987

[54] CORE FOR A NUCLEAR REACTOR COOLED BY WATER UNDER PRESSURE

[75] Inventor: Jean-Paul Millot, Elancourt, France

[73] Assignee: Framatome & Cie, Courbevoie, France

[21] Appl. No.: 653,804

[22] Filed: Sep. 24, 1984

[30] Foreign Application Priority Data

Sep. 30, 1983 [FR] France ................... 83 15591

[51] Int. Cl.⁴ ............................ G21C 7/00; G21C 1/00
[52] U.S. Cl. ................................. 376/209; 376/173; 376/346
[58] Field of Search ........................ 376/171–173, 376/209, 346

[56] References Cited

U.S. PATENT DOCUMENTS

| | | | |
|---|---|---|---|
| 2,992,174 | 7/1961 | Edlund et al. | 376/173 |
| 3,335,060 | 8/1967 | Diener | 376/173 |
| 3,336,201 | 8/1967 | Graham et al. | 376/267 |
| 3,351,532 | 11/1967 | Raab, Jr. et al. | 376/173 |
| 3,396,078 | 8/1968 | Visner | 376/173 |
| 3,960,655 | 6/1976 | Bohanan et al. | 376/173 |
| 4,293,380 | 10/1981 | Robbins | 376/209 |
| 4,451,427 | 5/1984 | Ross et al. | 376/267 |
| 4,495,136 | 1/1985 | Camden, Jr. et al. | 376/172 |

FOREIGN PATENT DOCUMENTS

| | | | |
|---|---|---|---|
| 2819734 | 12/1979 | Fed. Rep. of Germany | 376/346 |
| 3008472 | 9/1981 | Fed. Rep. of Germany | 376/173 |
| 2535509 | 5/1984 | France . | |
| 2535508 | 5/1984 | France . | |

*Primary Examiner*—Harvey E. Behrend
*Attorney, Agent, or Firm*—Pollock, Vande Sande & Priddy

[57] ABSTRACT

The invention relates to a core for a nuclear reactor cooled with water under pressure.

The core comprises a first group of zones (1, 2) extending over its entire height and over a fraction of its transverse section where the fuel rods contain mainly enriched uranium oxide, and a second group of zones (3) inserted between the zones (1, 2) of the first group where the rods contain mainly plutonium. The rods of zones (1, 2) of the first group emit neutrons and maintain the neutron reactions. The energy spectrum of the neutrons is in the thermal region in the zones (1, 2). The rods of the zones (3) of the second group are spaced at a distance which is appreciably smaller than the distance separating the rods of the zones (1, 2) so that the neutrons produced therein are in the high energy region.

The invention applies, in particular, to nuclear reactors with spectral shift control.

5 Claims, 2 Drawing Figures

CORE FOR A NUCLEAR REACTOR COOLED BY WATER UNDER PRESSURE

FIELD OF THE INVENTION

The invention relates to a core for a nuclear reactor cooled with water under pressure.

Pressurized water nuclear reactors comprise a core consisting of prismatic assemblies arranged vertically and side by side and immersed in the cooling water which circulates inside the reactor vessel enclosing the core.

Each of the assemblies consists of a cluster of parallel fuel rods arranged in the longitudinal direction of the assembly and spaced in the transverse direction to form a regular lattice in each of the cross sections. Each rod of the cluster consists of a cladding tube enclosing pellets of a fuel material which is generally uranium oxide enriched in fissile uranium. The core unit is made up of identical assemblies and the concentration of fissile material is sufficient to permit the emission of neutrons and the maintaining of the neutron reaction inside the core. The latter is then said to be critical.

The space between the rods inside the core is such that a layer of cooling water of a certain thickness surrounds each rod during the operation of the reactor. This layer of water permits the moderation of the emitted neutrons and their energy spectrum remains in a region called the thermal region.

The reactors which operate with a core formed as has just been described consume large quantities of natural uranium which captures a fraction of the emitted neutrons to form plutonium. Furthermore, in the pressurized water reactors known at present, only a small part of the natural uranium introduced into the core is applied.

The plutonium which is formed is recovered during plant reprocessing of the irradiated fuel assemblies but this plutonium, which may be employed to form a part of the load in the nuclear reactors of the converter type remains largely unused at the present time since the reactors of the converter type have not yet reached an adequate stage of industrial development.

PRIOR ART

Thought has therefore been given to employing this plutonium to reduce the consumption of uranium in water cooled reactors. For this purpose plutonium in the form of oxide is incorporated in the uranium oxide powder in the manufacture of fuel pellets with which the cladding tubes of the assemblies are filled. It is impossible however to introduce large quantities of plutonium into the nuclear fuel and moreover this plutonium is rapidly degraded by preferential production of a non-fissile isotope through the action of low-energy thermal neutrons present in the reactor core.

In fact, the plutonium produced by the reprocessing contains 70% of fissile material consisting of the odd-numbered isotopes Pu 239 and Pu 241 and 30% of fertile material consisting of the non-fissile, even-numbered isotopes Pu 240 and Pu 242. Now, the neutrons which are in the thermal range do not permit an optimum use of the fissile isotopes nor make it possible to obtain an appreciable conversion of the fertile isotopes.

Consequently, plutonium cannot be employed in an economical manner in water-cooled nuclear reactors as designed at present, because of the relatively low energy of the neutrons in the core of these reactors. Plutonium can be recycled in these reactors only a very limited number of items because it is degraded by an increase in the proportion of the non-fissile even-numbered isotopes which cannot be converted into fertile material to a marked degree in the reactor.

In order to improve the yield of nuclear fuel in the pressurized water nuclear reactors, it has been proposed to increase the neutron energy in the first part of the life of the reactor core by reducing the quantity of the moderating water inside the assemblies and by introducing a neutron-absorbing material in some guide tubes in the latter. This method which is the subject of French Patent specifications Nos. 2,535,509 and 2,535,508 makes it possible to obtain an increased production of fissile plutonium which takes part in maintaining the fission reaction and makes it possible to save a part of the uranium. However, the fissile plutonium produced is not employed in an optimum manner, particularly when the reactor is brought back into a low-energy neutron spectrum, during the second part of the cycle.

SUMMARY OF THE INVENTION

The aim of the invention is therefore to offer a core for a nuclear reactor cooled with water under pressure, consisting of prismatic assemblies arranged vertically and side by side, immersed in the cooling water and each formed by a cluster of parallel fuel rods spaced so as to permit the circulation of the cooling water and the formation around these rods of a layer of water for moderating the neutrons emitted, this core permitting the recycling plutonium to be employed under very good conditions, while being of a construction which does not require major modifications of the water-cooled nuclear reactors as constructed at present.

To this end, the core comprises:

a first group of zones extending over its entire height and over a fraction of its transverse section where the fuel rods contain mainly enriched uranium oxide so as to emit neutrons and to maintain the neutron reaction and are spaced at a distance permitting the formation of a layer of moderating water around these rods which is sufficient to bring the energy spectrum of the neutrons into the thermal region, and a second group of zones inserted between the zones of the first group where the fuel rods contain mainly plutonium and are spaced at a distance which is appreciably smaller than the distance separating the rods of the first group.

BRIEF DESCRIPTION OF THE DRAWING

In order to make the invention well understood, a description will now be given by way of non-limiting example, with reference to the attached drawing, of an embodiment of a core of a nuclear reactor cooled with water under pressure of the type with spectral shift control and a heterogeneous composition, according to the invention.

DETAILED DESCRIPTION

Figure 1:
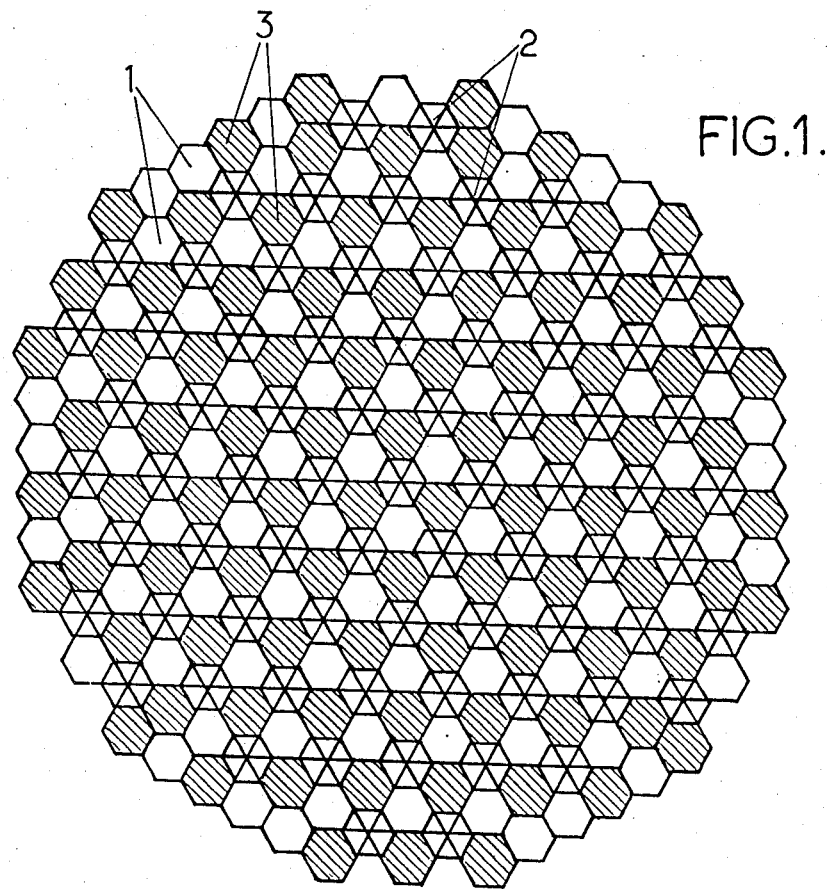
FIG. 1 is a transverse section of the core of the pressurized water nuclear reactor with spectral shift control.

FIG. 1 shows a core of a pressurized water nuclear reactor incorporating prismatic assemblies with hexagonal cross-sections placed side by side and occupying the entire height of the core.

In contrast to the core of pressurized water nuclear reactors of the prior art, these assemblies are not all identical.

Figure 2:
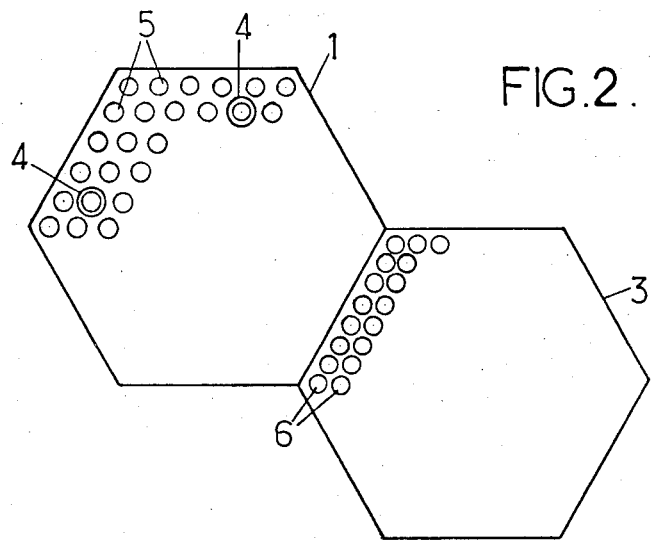
FIG. 2 is a transverse cross-section of two adjacent fuel assemblies in the core of FIG. 1, or an enlarged scale.

Referring to FIGS. 1 and 2, assemblies 1 and 2 consist of clusters of rods 5 containing enriched uranium oxide and arranged according to a lattice providing interstices between the rods for the formation of layers of water of a sufficient thickness for moderating the neutrons as far as the thermal region. Some rods of the assembly lattice are replaced with guide tubes and into these guide tubes can be inserted rods of depleted uranium as described in French Pat. No. 2,535,508.

The insertion of rods of depleted uranium into the guide tubes 4 of the assemblies of the type 1 and 2 during the first part of the fuel cycle makes it possible to displace water from these guide tubes, to harden the neutron spectrum and thus to increase the production of plutonium in the fuel. An additional hardening derives from the fact that the rods of depleted uranium absorb the low-energy neutrons. The production of plutonium is also increased by the fact that a part of uranium 238 present in the depleted uranium rods is converted into plutonium.

In the assemblies of type 1, only the uranium rods which permit a spectral shift to be obtained are inserted in the guide tubes 4, while in the assemblies of type 2, some guide tubes are reserved for the movement of the rods controlling the reactivity of the reactor core during its operation. The guide tubes of these assemblies 2 therefore receive, on the one hand, the rods of depleted uranium of the device for spectral shift control and, on the other hand, the reactor control rods.

The assemblies 1 and 2 form a group of zones which extend over the entire height of the reactor core where the uranium oxide fuel rods have interstices of a relatively large size.

Between the zones formed by the assemblies 1 and 2, the core comprises assemblies 3 of a composition and structure which are completely different from the assemblies 1 and 2. The assemblies 3 are arranged as a checkboard between the assemblies 1 and 2.

The assemblies 3 consist of rods 6 comprising mainly recovered plutonium containing 70% of fissile isotopes and 30% of non-fissile isotopes.

These rods are arranged in a regular lattice whose interstices have a size which is much less than the size of the interstices in the assemblies 1 and 2. The interstices have an average size which is approximately three times less than the size of the interstices of assemblies 1 and 2. This small interstice between the plutonium rods can be obtained by winding spacer wires in a spiral on these tubes as in the assemblies of the reactors of the undermoderated type whose spectrum is intermediate between a thermal neutron spectrum and a fast neutron spectrum.

In the assemblies 3, no control rods nor spectral shift control rods are inserted and the whole lattice consists of rods of recovered plutonium, independently of the components of the assembly required to ensure its rigidity.

The whole of the core which can be seen in FIG. 1 therefore consists of a juxtaposition of zones each of which consists of an assembly of the type 1 or 2 or of type 3. A checkboard arrangement such as shown has the advantage that each of the assemblies 3 is surrounded by assemblies of the type 1 and 2 which produce the neutrons required to maintain the nuclear reactions.

The assemblies 3 may be produced in the form of subcritical assemblies, that is to say whose neutron activity would be insufficient to maintain the neutron reaction.

Inside the assemblies 3, the neutrons produce the fission of some of the nuclei of the odd-numbered isotopes of plutonium, which produces neutrons which are only very slightly moderated by the thin layer of water present between the rods of the assembly 3. These high-energy neutrons convert a part of the non-fissile plutonium into fissile plutonium, with the result that the latter is not degraded during the use of the reactor. A recycling of this plutonium can therefore be envisaged as for the assemblies containing uranium oxide.

The core shown in FIG. 1 comprises 236 assemblies of types 1 and 2, namely 163 assemblies of the spectral shift type receiving only rods of enriched uranium and 73 assemblies receiving both rods of enriched uranium and reactor control clusters. This core comprises, inserted among these 236 assemblies 1 and 2, 90 assemblies of the type 3 which are undermoderated and contain plutonium.

These 90 assemblies 3 contain an insufficient quantity of fissile material to produce neutron criticality by themselves, and they are therefore called sub-critical.

The assemblies 1 and 2 which act as the neutron source for the assemblies 3 do not require a high initial enrichment since the spectral shift control rods permit the reactor to be operated with neutrons of an increased energy during the first part of the life of the reactor core.

The core of a pressurized water nuclear reactor such as shown in FIG. 1 makes it possible to obtain a saving of fissile material of 30% relative to a fissile load containing only uranium, by virtue of the 90 assemblies containing rods of recycled plutonium.

The fact that the assemblies containing plutonium are arranged checkboard fashion between the zones formed by the spectral shift control assemblies permits an additional hardening of the neutron spectrum relative to that obtained solely by the undermoderation in the assemblies 3 and therefore an increased production of fissile material which permits an additional gain of the order of 20%.

However, the invention is not limited to the embodiment which has been described; on the contrary, it comprises all the alternative forms.

Thus, the assemblies forming the first group of the core zones which are produced in a heterogeneous form could consist of conventional assemblies of a pressurized water nuclear reactor which are not intended to receive spectral shift control rods. However, in this case it is necessary to employ assemblies having a high initial enrichment so that they can fulfill their function as a source for the assemblies containing plutonium. This presents disadvantages if it is intended to use the fuel with high burn-up ratios.

The assemblies forming the core can have a cross-section which is different from a hexagonal section, for example a square section, as is current practise for the assemblies forming the cores in pressurized water nuclear reactors.

The zones of the first group containing uranium can consist of a single assembly, of several assemblies or even of a part of an assembly containing both uranium oxide rods and plutonium rods. In all these cases, however, the zones of the second group containing plutonium must be distributed between the zones of the first group containing uranium oxide, to permit a satisfactory neutron operation of the core. These zones must also have transverse dimensions which are sufficiently small to ensure a good neutron operation.

Finally, the invention applies to all the watercooled nuclear reactors whose core consists of a juxtaposition of clusters of parallel fuel elements.

I claim:

1. A nuclear reactor having a core and water coolant flowing therethrough, said core consisting of prismatic assemblies of identical cross-section arranged vertically and side by side and each comprising a cluster of vertical fuel rods spaced to permit circulation of the water coolant, said fuel assemblies comprising:

a plurality of first fuel assemblies whose fuel rods contain initially contain enriched uranium only, certain of the fuel rods being substituted which guide tubes in the cluster and said fuel rods being sufficiently spaced for the neutron energy spectrum within said furst fuel assemblies to be thermal at least when there is water within said guide tubes, and a plurality of second fuel assemblies in which all fuel rods initially contain recovered plutonium only and are so spaced that the neutron energy spectrum within said second fuel assemblies is higher than thermal, said first and second fuel assemblies being distributed throughout the reactor core.

2. A nuclear reactor as claimed in claim 1, wherein said plurality of first fuel assemblies includes fuel assemblies whose guide tubes are arranged for receiving spectral shift control rods only and fuel assemblies whose guide tubes include guide tubes arranged to receive reactor reactivity control rods and guide tubes arranged to receive spectral shift control rods.

3. A nuclear reactor as claimed in claim 1, wherein said fuel assemblies are of hexagonal cross-section and wherein each of said second fuel assemblies is surrounded by first fuel assemblies, in the central part of said core.

4. A nuclear reactor as claimed in claim 1, wherein the distance between adjacent fuel rods in said second fuel assemblies is substantially equal to one third of the distance between the fuel rods in the first fuel assemblies.

5. A nuclear reactor as claimed in claim 1, wherein said first fuel assemblies and second fuel assemblies are distributed evenly throughout the core.

* * * * *